Patented Nov. 7, 1922.

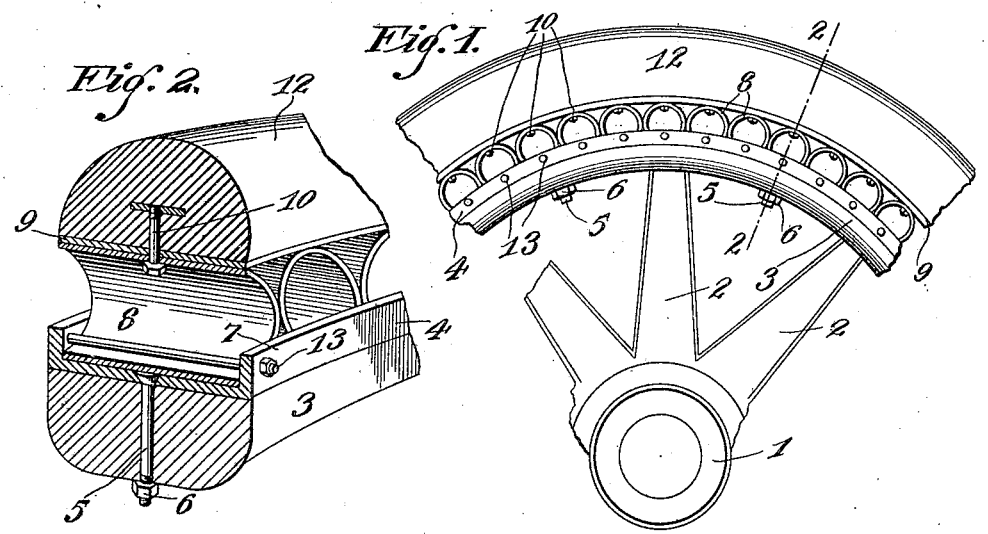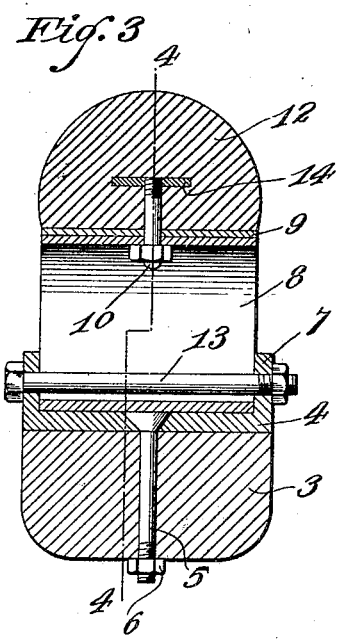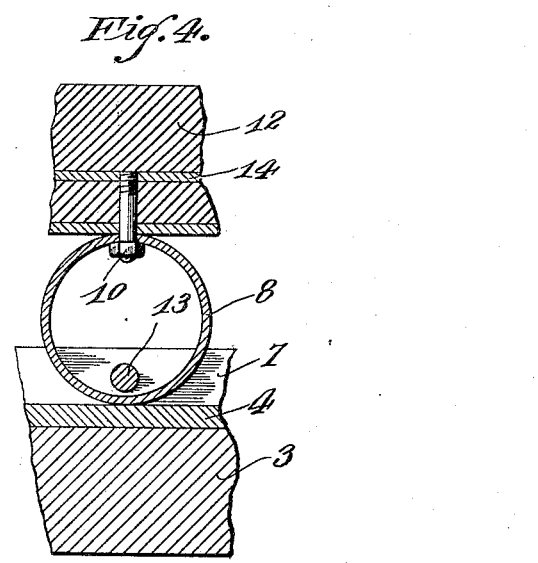

1,434,719

UNITED STATES PATENT OFFICE.

SYLVESTER R. MURPHY, OF OMAHA, NEBRASKA, AND GEORGE DUMAS, OF TIE SIDING, WYOMING.

RESILIENT TIRE.

Application filed March 15, 1922. Serial No. 543,988.

*To all whom it may concern:*

Be it known that we, SYLVESTER R. MURPHY, a citizen of the United States, residing at Omaha, in the county of Douglas and State of Nebraska, and GEORGE DUMAS, a citizen of the United States, residing at Tie Siding, in the county of Albany and State of Wyoming, have invented certain new and useful Improvements in Resilient Tires, of which the following is a specification.

This invention relates to vehicle wheels, and it relates particularly to wheels having resilient tires of a form adapting them for substitution for wheels having pneumatic tires of the kind commonly used on automobiles.

The object of the invention is to provide a tire which shall be more durable, less expensive, and more easily applied to or removed from a wheel than a pneumatic tire, and which, while possessing the necssary resiliency, shall be free from injury from any cause which would result in perforating or rim-cutting a pneumatic tire.

With this object in view, the invention consists in a tire having the novel generic and specific features of construction and arrangement of the parts substantially as hereinafter described and claimed.

One form of embodiment of the invention is illustrated in the accompanying drawing, in which:

Figure 1 is a side elevation or a portion of a vehicle wheel, showing the improved tire applied thereto.

Figure 2 is a perspective view, partly in section, showing a tread and a felly of a form adapted for constituting a part of the improved construction, particularly showing the form, arrangement and means for securing the spring cylinders employed in place.

Figure 3 is a transverse sectional view of the tire and felly, and

Figure 4 is a sectional view of the parts shown in Figure 3, the section being taken on line 4—4 of Figure 3 at a right angle to the section shown in such figure.

In the drawing 1 represents the hub of a wheel, and 2 represents spokes extending therefrom, the parts being of any suitable form. Permanently attached to the outer ends of the spokes is a felly 3, which may be of wood or metal. Mounted on the outer face of the felly is a circular plate or ring 4 which corresponds to the rim of a wheel of the novel construction and which is of an inner diameter corresponding to the outer diameter of the felly. The ring may be secured to the felly in any suitable way as by bolts 5 having the heads thereof located in countersinks in the outer face of the plate or ring 4, passing through the plate and felly and each provided with a nut 6 bearing against the inner face of the felly.

Each side of the plate or ring 4 has extending outwardly therefrom a flange 7, preferably at right angles to the plate or ring, and which form a channel or way for the reception and retention of a series of hollow metal cylinders 8.

The cylinders 8 have continuous unbroken walls, are composed of tough, resilient steel, and are of a length corresponding to the distance between the flanges 7 of the ring 4. The cylinders are placed between the flanges 7 of the ring 4 and extend transversely of the ring. Passing longitudinally through each cylinder 8 is a bolt 13 the ends of each of which are received in oppositely located openings in the flanges 7. The bolts 13 are normally located a short distance outward from the inner faces of the cylinders, and, while preventing undue outward movements of the cylinders, allow limited rolling or rocking movements of the latter when tangential pressure is applied to the tread to which the cylinders are connected.

The diameters of the circular plate or ring 4 and of the cylinders 8 are such that when a requisite number of the cylinders are arranged completely to fill the way formed by the flanges 7 each cylinder will abut against each adjacent cylinder. Thus as the means for securing the cylinders to the circular plate or ring 4 allows limited rolling movements of the cylinders, when strain is imposed upon the structure or it is subjected to shock the effect is neutralized because such strain or shock is transmitted to successive cylinders, in one direction or the other, until absorbed, thus rendering riding comfortable in a vehicle to which the device is attached.

Surrounding the series of cylinders 8 is a circular ring 9 the inner diameter of which corresponds to a circle drawn around the outer surfaces of the cylinders when the latter are in their normal positions not subjected to strain or pressure. The ring serves to maintain the cylinders in place in the way formed for them by the flanges 7 of the rim 4. The ring is preferably of flat, resilient metal so that it may readily conform to the positions of the outer surfaces of the cylinders against which it bears. Bearing upon the ring is a tread 12, which may be of any suitable material, such as solid rubber.

The ring 9 and tread 12 are attached to the cylinders 8 in any suitable way. The means herein shown consists of a flat, yielding, circular plate 14 embedded in the body of the tread 12 and having openings arranged at intervals for the reception of screw bolts 10, each passing through openings through the upper portions of the cylinders and through the ring and entering screw threaded openings in the plate 14, the heads of the bolts bearing against the inner faces of the cylinders.

The construction described insures a uniform yielding throughout the entire tire, and riding in a vehicle to which it is attached is rendered as comfortable as in one having pneumatic tires. The tire is cheap in first cost; any worn or broken parts can be replaced at a small cost; and the liability of punctures and similar injuries incident to the use of pneumatic tires is eliminated.

We claim:

A rim having outwardly extending flanges at its edges, a series of hollow metallic resilient cylinders having continuous walls arranged transversely of the rim between the flanges, each cylinder being in contact with adjacent cylinders, a bolt extending through each cylinder and attached to the flanges, the bolts being located a short distance from the inner faces of the cylinders, a ring surrounding and bearing on the cylinders, and a tread attached to the ring.

In testimony whereof we affix our signatures.

SYLVESTER R. MURPHY.
GEORGE DUMAS.